(12) United States Patent
Yu et al.

(10) Patent No.: US 11,100,950 B1
(45) Date of Patent: Aug. 24, 2021

(54) METHOD FOR READING AND WRITING WITH HOLOGRAPHIC SYSTEM AND HOLOGRAPHIC STORAGE SYSTEM

(71) Applicant: National Central University, Taoyuan (TW)

(72) Inventors: Yeh-Wei Yu, Taoyuan (TW); Ching-Cherng Sun, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 17/084,607

(22) Filed: Oct. 29, 2020

(30) Foreign Application Priority Data

Oct. 15, 2020 (TW) .................................. 109135784

(51) Int. Cl.
| | | |
|---|---|---|
| *G11B 7/00* | (2006.01) | |
| *G11B 7/1353* | (2012.01) | |
| *G11B 7/007* | (2006.01) | |
| *G11B 7/08* | (2006.01) | |
| *G11B 20/10* | (2006.01) | |
| *G11B 7/1372* | (2012.01) | |
| *G11B 7/0065* | (2006.01) | |

(52) U.S. Cl.
CPC .......... *G11B 7/1353* (2013.01); *G11B 7/0065* (2013.01); *G11B 7/00772* (2013.01); *G11B 7/083* (2013.01); *G11B 7/1372* (2013.01); *G11B 20/10222* (2013.01); *G11B 2007/13727* (2013.01)

(58) Field of Classification Search
None
See application file for complete search history.

(56) References Cited

U.S. PATENT DOCUMENTS

| | | | | |
|---|---|---|---|---|
| 5,377,176 A | * | 12/1994 | Redfield | G11B 7/0065 369/103 |
| 5,477,347 A | * | 12/1995 | Redfield | G11B 7/0065 359/22 |
| 5,729,364 A | * | 3/1998 | Bashaw | G03H 1/02 252/582 |
| 2007/0041302 A1 | * | 2/2007 | Kuroda | G11B 7/0065 369/103 |

(Continued)

FOREIGN PATENT DOCUMENTS

| | | |
|---|---|---|
| CN | 100451873 C | 1/2009 |
| TW | I556231 B | 11/2016 |
| TW | I571869 B | 2/2017 |

*Primary Examiner* — Peter Vincent Agustin
(74) *Attorney, Agent, or Firm* — CKC & Partners Co., LLC

(57) ABSTRACT

A method for reading and writing with holographic system includes the following operations: (a) providing a reference light and a signal light; (b) transferring the reference light and the signal light to an optical recording medium, for recording an interference grating; (c) changing the reference light and the signal light and repeating the operations (a) to (b) until M interference gratings are recorded on the optical recording medium; (d) providing a reading light to the optical recording medium, for reading the M interference gratings at the same time to generate an interference result, wherein the interference result is a result that diffraction signals of the M interference gratings interfere to each other; and (e) changing the reading light and repeating the operation (d), for obtaining N interference results. A holographic storage system is also disclosed herein.

17 Claims, 7 Drawing Sheets

(56) References Cited

U.S. PATENT DOCUMENTS

2007/0253043 A1* 11/2007 Bates .................. G03H 1/04
  359/35
2018/0267464 A1    9/2018 Minamiguchi

* cited by examiner

METHOD FOR READING AND WRITING WITH HOLOGRAPHIC SYSTEM AND HOLOGRAPHIC STORAGE SYSTEM

CROSS-REFERENCE TO RELATED APPLICATION

This application claims priority to Taiwan Application Serial Number 109135784, filed Oct. 15, 2020, all of which are herein incorporated by reference.

BACKGROUND

Field of Invention

The present disclosure relates to an optical system and an optical method. In detail, the present disclosure relates to a holographic storage system and a method for reading and writing with holographic system.

Description of Related Art

Recent holographic technique is mostly utilized by a manner of storing, based on unit frames. Each one of the unit frames includes mass data. Signals of the unit frames are independent to one another and do not interfere to one another, which leads to an extremely low diffraction efficiency. Accordingly, the above technique exists many defects, and some other applicable methods for reading hologram are still researched and developed by practitioners in the present field.

SUMMARY

The present disclosure provides a method for reading and writing with holographic system. The method for reading and writing with holographic system includes the following operations. (a) providing a reference light and a signal light; (b) transferring the reference light and the signal light to an optical recording medium, for recording an interference grating; (c) changing the reference light and the signal light and repeating the operations (a) to (b) until M interference gratings are recorded on the optical recording medium; (d) providing a reading light to the optical recording medium, for reading the M interference gratings at the same time to generate an interference result, wherein the interference result is a result that diffraction signals of the M interference gratings interfere to each other; and (e) changing the reading light and repeating the operation (d), for obtaining N interference results.

Another aspect of the present disclosure relates to a holographic storage system. The holographic storage system includes a spatial modulating device, an optical recording medium, an image receiving device, a first lens and a second lens, and a state controller. The spatial modulating device is configured to modulate a plurality of lights. The optical recording medium is configured to store an interference result. The image receiving device is configured to receive an interference signal. The first lens is disposed between the spatial modulating device and the optical recording medium, and is configured to transfer lights. The second lens is disposed between the spatial modulating device and the image receiving device, and is configured to transfer the lights. The state controller is configured to control, in a writing state, a spatial relationship between a plurality of light and the optical recording medium, and is configured to generate, in a reading state, a reading and writing phase offset. The state controller controls a spatial relationship between a reference light and the optical recording medium. The spatial modulating device provides a signal light. The reference light and the signal light are transferred through the first lens to the optical recording medium for recording an interference grating. The state controller and the spatial modulating device change the reference light and the signal light, and repeatedly record interference M gratings in the optical recording medium. In the reading state, the state controller controls a spatial relationship between a reading light and the optical recording medium, and reads M interference gratings at the same time for generating the interference result. The state controller changes the reading light for obtaining N interference results. An interference result of diffraction signals of the M interference gratings interfering to each other is transferred through the second lens to the image receiving device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1B:
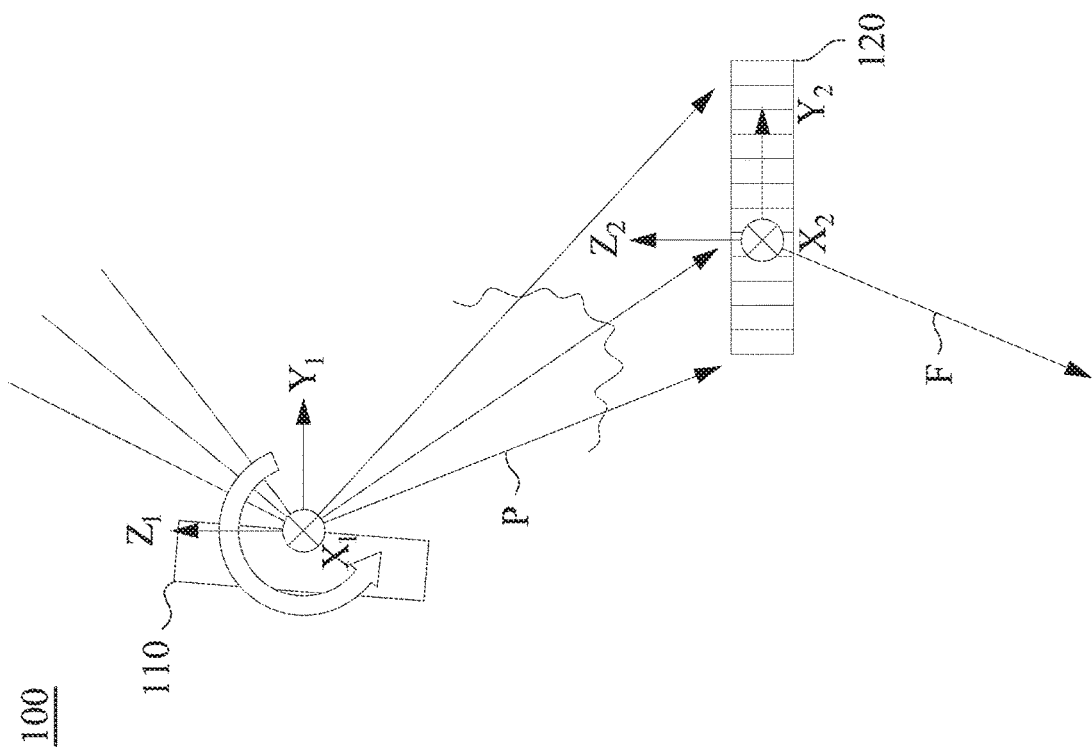
FIG. 1B is a schematic reading state diagram of a holographic storage system, in accordance with an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In this document, the terms used herein are merely used to describe specific embodiments, and does not intend to limit the present invention. Singular form, such as "a", "this", "such", "present one" or "the", used herein also include plural forms.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, although the terms "first," "second," etc., may be used herein to describe various elements, these terms are used to distinguish one element from another.

Unless the context indicates otherwise clearly, these terms does not specifically refer to or imply order or sequence, nor does they intend to limit the present invention.

The present disclosure creates a holographic system or a holographic storage system. A specific optical electric field signal IVO read from the holographic system or the holographic storage system changes when a state control volume u changes, and it is indicated as:

$$B_r(u) = \sum_{j=1}^{M} A_r(u_j) \exp[i\phi(u - u_j)] \qquad \text{Equation 1}$$

A secondary derivative of ø(u) with respect to u is not equal to zero, which is indicated as:

$$\frac{d^2\phi(u)}{du^2} \neq 0 \qquad \text{Equation 2}$$

"r" in the equation 1 is a spatial parameter. "u" in the equation 1 is a state control volume. "$u_j$" in the equation 1 is a value of u at j-th writing state. "ø(u−$u_j$)" in the equation 1 is a reading and writing phase offset between a diffraction signal when the state control volume is u and a diffraction signal at a position that u=$u_j$, which is also indicated as ø(0)=0. It should be noted that, ø(u) changes when the spatial parameter r changes, which is also indicated as $ø_r$(u). If ø(u) does not change when the spatial parameter r changes, such system becomes simpler. A physical meaning of the equation 1 is that when the spatial parameter is equal to r, if the state control volume is equal to u, the read optical electric field signal $B_r$(u) is a result of a superposition by signals that are respectively read from writing signals $A_r$($u_j$). The writing signals $A_r$($u_j$) may be selected to approach the optical electric field signal IVO that are expected to be read.

Figure 1A:
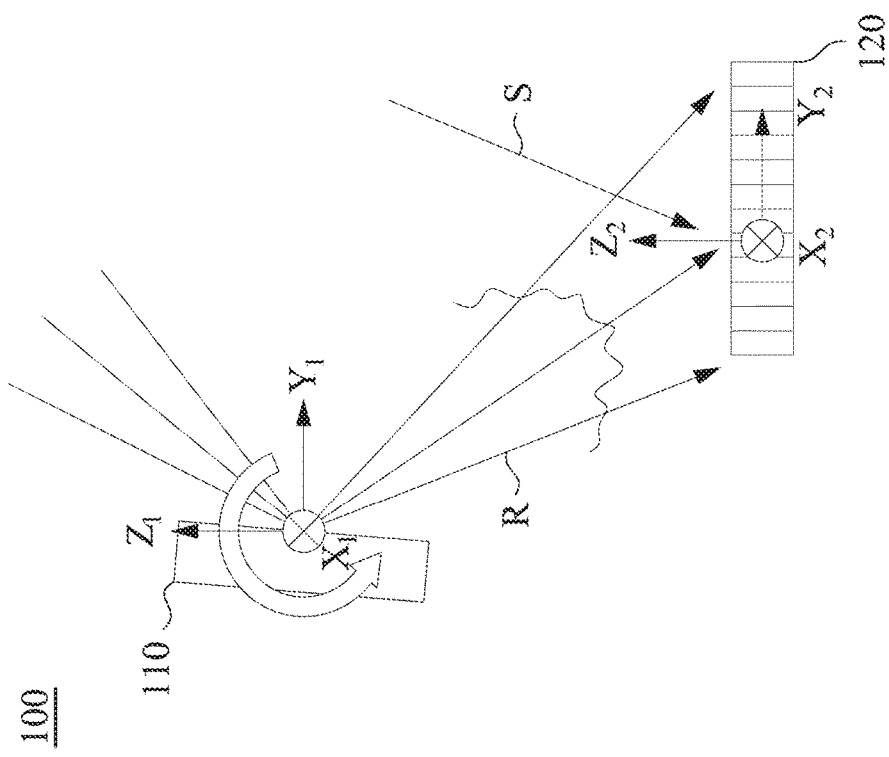
FIG. 1A is a schematic architecture and recording state diagram of a holographic storage system, in accordance with an embodiment of the present disclosure.
Figure 2B:
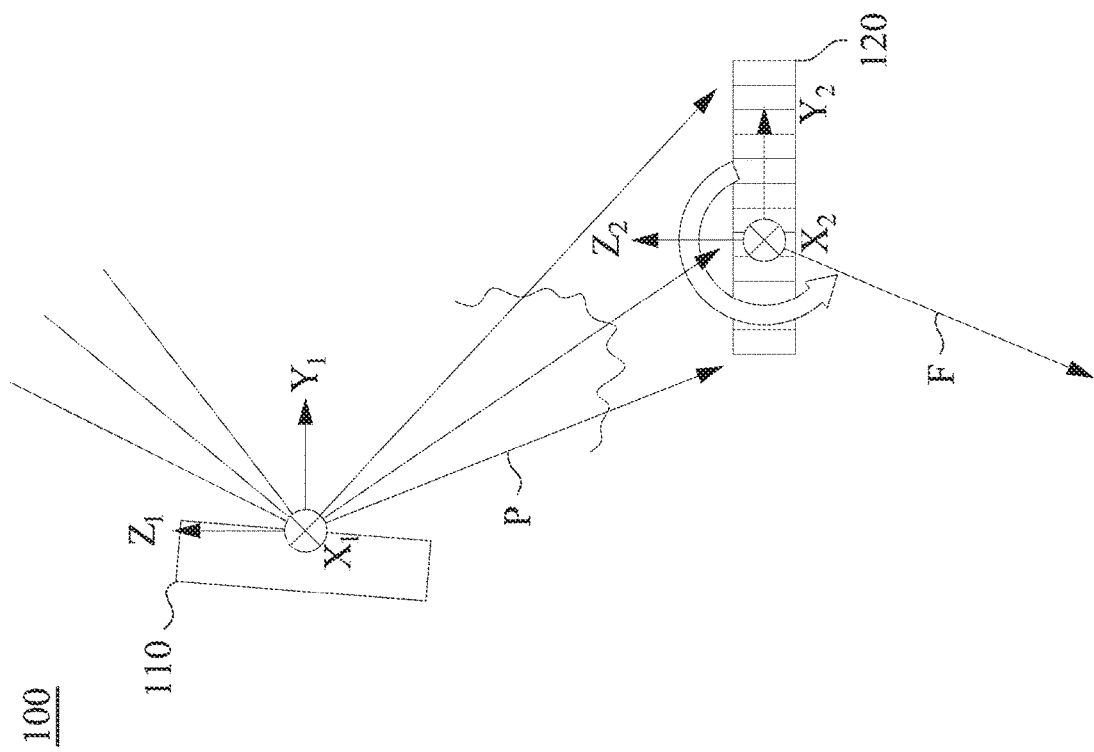
FIG. 2B is a schematic reading state diagram of a holographic storage system, in accordance with an embodiment of the present disclosure.
Figure 2A:
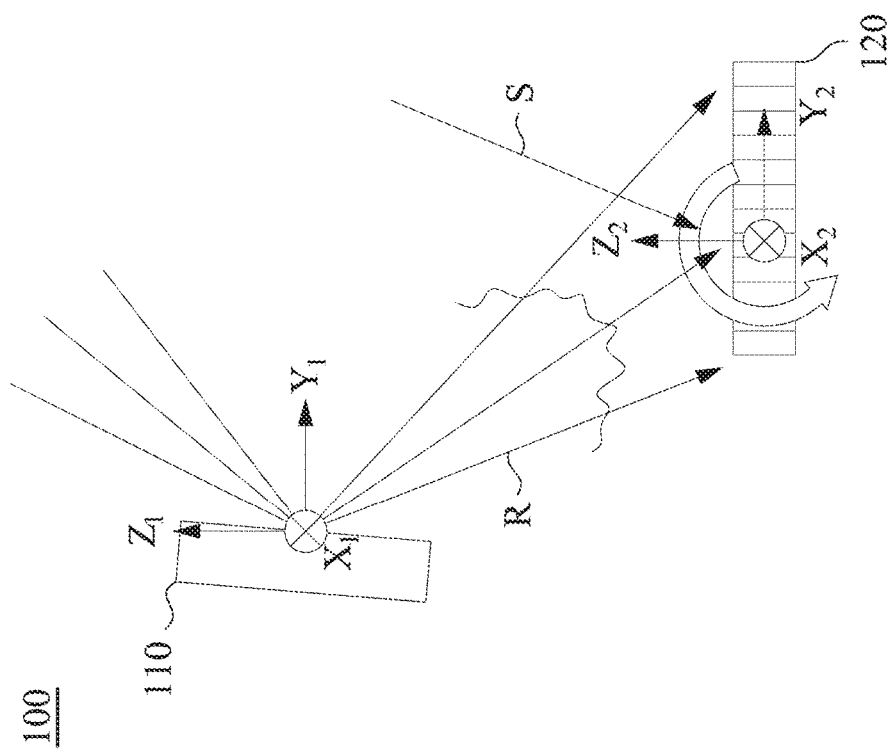
FIG. 2A is a schematic recording state diagram of a holographic storage system, in accordance with an embodiment of the present disclosure.

FIG. 1A is a schematic architecture and recording state diagram of a holographic system or a holographic storage system, in accordance with an embodiment of the present disclosure. FIG. 2A is a schematic recording state diagram of a holographic storage system, in accordance with an embodiment of the present disclosure. FIG. 2B is a schematic reading state diagram of a holographic storage system, in accordance with an embodiment of the present disclosure. In some embodiments, with reference to FIGS. 1A to 1B, a holographic system 100 includes a mirror 110 and an optical recording medium 120.

In some embodiments, the optical recording medium 120 includes doped transition metal(s), rare-earth element(s), and medium(s) that is/are photosensitive. The optical recording medium 120 is configured to store at least one interference result of at least one reference light R and at least one signal light S. This interference result structurally forms a specific grating in the optical recording medium 120.

In some embodiments, the optical recording medium 120 includes polymer medium of doped photosensitive monomer(s). The optical recording medium 120 is configured to store the interference result of the reference light R and the signal light S. This interference result structurally forms a specific grating in the optical recording medium 120.

In some embodiments, amplitude(s) (or strength(s)) or/and phase(s) of the signal light S, at a specific position, is/are modulated by a spatial light modulator (not shown). The signal light S is transferred to the optical recording medium 120 by an optical system, and the amplitude (or the strength) or/and the phase $A_{\alpha,\beta}(u_j)$ of the signal light S is/are controlled with a specific incident angle by the spatial light modulator.

In some embodiments, the amplitude (or the strength) or/and the phase of the signal light S, at a specific position, is/are modulated by the spatial light modulator (not shown). The signal light S is transferred to the optical recording medium 120 by the optical system, and the amplitude (or the strength) or/and the phase $A_{x,y}(u_j)$ of the signal light S is/are controlled with a specific incident position by the spatial light modulator.

In some embodiments, a state controller 130 (which is shown in at least FIGS. 3A-3B) is a rotary actuator. The state controller 130 rotates the mirror 110 with respect to an $x_1$ axis or an $y_1$ axis, for changing an angle (which is shown in FIG. 1A) that the reference light R incidents onto the optical recording medium 120. Wave fronts of the reference light R are spherical wave fronts with a spherical aberration. As such, depths of point sources of the wave fronts of the reference light R with various angles are different from one another. Furthermore, when the mirror 110 alters the angles, a secondary derivative of the phase difference of the wave fronts that illuminates the disc with respect to the angle difference is not equal to zero, which is indicated as $$\frac{d^2\phi(u)}{du^2} \neq 0.$$

In a writing state, the state controller 130 may be controlled to cause a first state control volume $u_1$ (which is an angle between the reference light R and the optical recording medium 120). Furthermore, in the writing state, the spatial light modulator (not shown) may be controlled to generate a writing signal $A_r(u_1)$ (which is $A_{\alpha,\beta}(u_1)$ or $A_{x,y}(u_1)$, in some embodiments). Also, in the writing state, a first grating is recorded in the optical recording medium 120 by utilizing the reference light and the signal light S. Subsequently, the state controller 130 causes a second state control volume $u_2$ (which is an angle that the reference light R incidents onto the optical recording medium 120). Furthermore, the spatial light modulator (not shown) generates a writing signal $A_r(u_2)$, and a second grating is recorded in the optical recording medium 120 by utilizing the reference light R and the signal light S. Continuously, on the above basis, M interference gratings are recorded in the optical recording medium 120. In a reading state, the state controller 130 may be controlled to change the state control volume u of the reading light P (which is an angle that a reading light P incidents onto the optical recording medium 120). As such, the optical recording medium 120 is irradiated by the reading light P, for proceeding a reading operation. Eventually, a specific spatial optical electric field signal F in the equation 1 is generated, wherein a physical volume of the specific spatial optical electric field signal F is indicated as $B_r(u)$. The specific spatial optical electric field signal F changes when the state control volume u changes.

In some embodiments, the state controller 130 is a rotary actuator. The state controller 130 rotates the optical recording medium 120 with respect to an $x_2$ axis or an $y_2$ axis, for changing an angle (which is shown in FIG. 2A) that the reference light R incidents onto the optical recording medium 120. Wave fronts of the reference light R are spherical wave fronts with the spherical aberration. As such, depths of point sources of the wave fronts of the reference light R with various angles are different from one another. Furthermore, when the optical recording medium 120 alters the angles, a secondary derivative of the phase difference of the wave fronts that illuminates the disc with respect to the angle difference is not equal to zero, which is indicated as $$\frac{d^2\phi(u)}{du^2} \neq 0.$$

In the writing state, the state controller 130 may be controlled to cause a first state control volume $u_1$ (which is an angle between the reference light R and the optical recording medium 120). Furthermore, in the writing state, the spatial light modulator (not shown) may be controlled to generate the writing signal $A_r(u_1)$ (which is $A_{\alpha,\beta}(u_1)$ or $A_{x,y}(u_1)$, in some embodiments). Also, in the writing state, a first grating is recorded in the optical recording medium 120 by utilizing the reference light R and the signal light S. Subsequently, the state controller 130 causes the second state control volume $u_2$ (which is an angle that the reference light R incidents onto the optical recording medium 120). Furthermore, the spatial light modulator (not shown) generates the writing signal $A_r(u_2)$, and a second grating is recorded in the optical recording medium 120 by utilizing the reference light R and the signal light S. Continuously, on the above basis, M interference gratings are recorded in the optical recording medium 120. In the reading state, the state controller 130 may be controlled to change the state control volume u of the reading light P (which is an angle that a reading light P incidents onto the optical recording medium 120). As such, the optical recording medium 120 is irradiated by the reading light P, for proceeding the reading operation. Eventually, a specific spatial optical electric field signal F in the equation 1 is generated, wherein a physical volume of the specific spatial optical electric field signal F is indicated as $B_r(u)$. The specific spatial optical electric field signal F changes when the state control volume u changes.

In some embodiments, the state controller 130 is a rotary actuator. The state controller 130 rotates the mirror 110 with respect to a $z_1$ axis, for changing a position that the reference light R incidents onto the optical recording medium 120. Wave fronts of the reference light R are spherical wave fronts with the spherical aberration. As such, when the mirror 110 alters the angles, a secondary derivative of the phase difference ø(u) of the wave fronts that illuminates the disc with respect to the angle difference is not equal to zero, which is indicated as $$\frac{d^2\phi(u)}{du^2} \neq 0.$$

In the writing state, the state controller 130 may be controlled to cause the first state control volume $u_1$ (which is a position that the reference light R incidents onto the optical recording medium 120). Furthermore, in the writing state, the spatial light modulator (not shown) may be controlled to generate the writing signal $A_r(u_1)$ (which is $A_{\alpha,\beta}(u_1)$ or $A_{x,y}(u_1)$, in some embodiments). Also, in the writing state, the first grating is recorded in the optical recording medium 120 by utilizing the reference light and the signal light S. Subsequently, the state controller 130 causes the second state control volume $u_2$ (which is a position that the reference light R incidents onto the optical recording medium 120). Furthermore, the spatial light modulator (not shown) generates the writing signal $A_r(u_2)$, and the second grating is recorded in the optical recording medium 120 by utilizing the reference light R and the signal light S. Continuously, on the above basis, M interference gratings are recorded in the optical recording medium 120. In a reading state, the state controller 130 may be controlled to change the state control volume u of the reading light P (which is a position that the reading light P incidents onto the optical recording medium 120). As such, the optical recording medium 120 is irradiated by the reading light P, for proceeding the reading operation. Eventually, a specific spatial optical electric field signal F in the equation 1 is generated, wherein a physical volume of the specific spatial optical electric field signal F is indicated as $B_r(u)$. The specific spatial optical electric field signal F changes when the state control volume u changes.

In some embodiments, the state controller 130 is a rotary actuator. The state controller 130 rotates the optical recording medium 120 with respect to a $z_2$ axis, for changing a position that the reference light R incidents onto the optical recording medium 120. Wave fronts of the reference light R are spherical wave fronts with the spherical aberration. As such, when the optical recording medium 120 rotates the angles with respect to the $z_2$ axis, a secondary derivative of the phase difference ø(u) of the wave fronts that illuminates the disc with respect to the angle difference is not equal to zero, which is indicated as $$\frac{d^2\phi(u)}{du^2} \neq 0.$$

In the writing state, the state controller 130 may be controlled to cause the first state control volume $u_1$ (which is a position that the reference light R incidents onto the optical recording medium 120). Furthermore, in the writing state, the spatial light modulator (not shown) may be controlled to generate the writing signal $A_r(u_1)$ (which is $A_{\alpha,\beta}(u_1)$ or $A_{x,y}(u_1)$, in some embodiments). Also, in the writing state, the first grating is recorded in the optical recording medium 120 by utilizing the reference light R and the signal light S. Subsequently, the state controller 130 causes the second state control volume $u_2$ (which is a position that the reference light R incidents onto the optical recording medium 120). Furthermore, the spatial light modulator (not shown) generates the writing signal $A_r(u_2)$, and the second grating is recorded in the optical recording medium 120 by utilizing the reference light R and the signal light S. Continuously, on the above basis, M interference gratings are recorded in the optical recording medium 120. In the reading state, the state controller 130 may be controlled to change the state control volume u (which is a position that the reading light P incidents onto the optical recording medium 120) of the reading light P. As such, the optical recording medium 120 is irradiated by the reading light P, for proceeding the reading operation. Eventually, a specific spatial optical electric field signal F in the equation 1 is generated, wherein a physical volume of the specific spatial optical electric field signal F is indicated as $B_r(u)$. The specific spatial optical electric field signal F changes when the state control volume u changes.

In some embodiments, the state controller 130 is a displacement actuator. The state controller 130 moves the optical recording medium 120 with respect to a specific direction in the space, for changing a position that the reference light R incidents onto the optical recording medium 120. Wave fronts of the reference light R are spherical wave fronts with a spherical aberration. As such, when the optical recording medium 120 moves along the specific direction, a secondary derivative of the phase difference ø(u) of the wave fronts that illuminates the disc with respect to the angle difference is not equal to zero, which is indicated as $$\frac{d^2\emptyset(u)}{du^2} \neq 0.$$

In the writing state, the state controller 130 may be controlled to cause the first state control volume $u_1$ (which is a position that the reference light R incidents onto the optical recording medium 120). Furthermore, in the writing state, the spatial light modulator (not shown) may be controlled to generate the writing signal $A_r(u_1)$ (which is $A_{\alpha,\beta}(u_1)$ or $A_{x,y}(u_1)$, in some embodiments). Also, in the writing state, the first grating is recorded in the optical recording medium 120 by utilizing the reference light R and the signal light S. Subsequently, the state controller 130 causes the second state control volume $u_2$ (which is a position that the reference light R incidents onto the optical recording medium 120). Furthermore, the spatial light modulator (not shown) generates the writing signal $A_r(u_2)$, and the second grating is recorded in the optical recording medium 120 by utilizing the reference light R and the signal light S. Continuously, on the above basis, M interference gratings are recorded in the optical recording medium 120. In the reading state, the state controller 130 may be controlled to change the state control volume u of the reading light P (which is a position that the reading light P incidents onto the optical recording medium 120). As such, the optical recording medium 120 is irradiated by the reading light P, for proceeding the reading operation. Eventually, a specific spatial optical electric field signal F in the equation 1 is generated, wherein a physical volume of the specific spatial optical electric field signal F is indicated as $B_r(u)$. The specific spatial optical electric field signal F changes when the state control volume u changes.

Figure 3A:
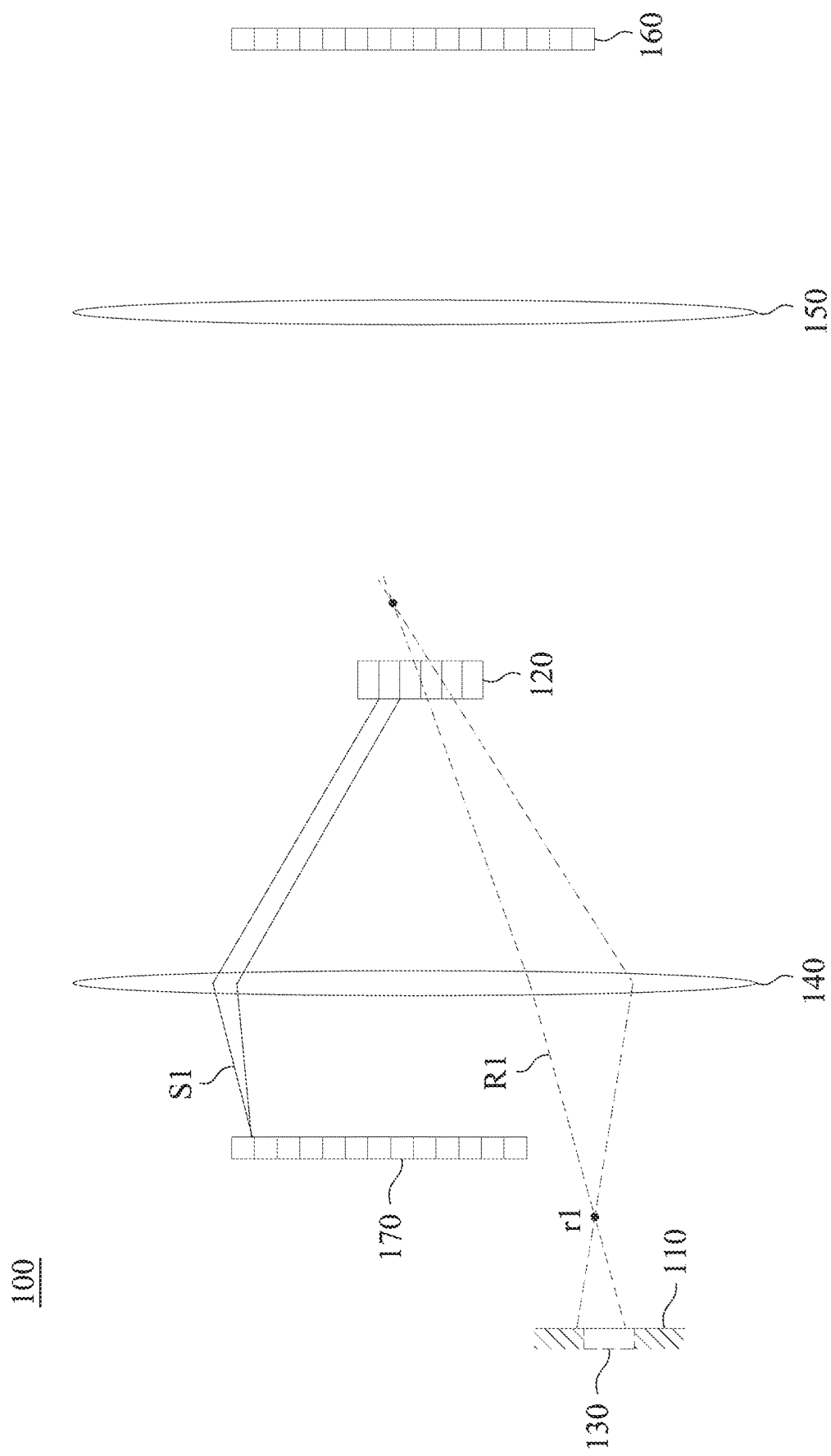
FIG. 3A is a schematic recording state diagram of a holographic storage system, in accordance with an embodiment of the present disclosure.

FIG. 3A is a schematic architecture and recording state diagram of a holographic storage system, in accordance with an embodiment of the present disclosure. In some embodiments, with reference to FIG. 3A, the holographic storage system 100 includes a mirror 110, a state controller 130, a spatial light modulator 170, a first lens 140, an optical recording medium 120, a second lens 150 and an image receiving device 160.

In some embodiments, the mirror 110 includes at least one plane mirror, at least one convex mirror, and at least one concave mirror. It should be illustrated that, shapes, positions, or sizes of the mirror 110 is not limited to that shown in figures of the present disclosure.

In some embodiments, when an optical system constituted by the first lens 140 causes a relationship between the spatial light modulator 170 and the optical recording medium 120 be a relationship of Fourier transform, a spatial optical field distribution $A_r(u_j)$ that is modulated by the spatial light modulator 170 in the optical recording medium 120 is an angle distribution. In this case, subscripts r of the $B_r(u)$ and $A_r(u_j)$ represent specific angles, and are also indicated as $B_{\alpha,\beta}(u)$ and $A_{\alpha,\beta}(u_j)$, respectively.

In some embodiments, when an optical system constituted by the first lens 140 causes a relationship between the spatial light modulator 170 and the optical recording medium 120 be a relationship of physics, a spatial optical field distribution $A_r(u_j)$ that is modulated by the spatial light modulator 170 in the optical recording medium 120 is a position distribution. In this case, a subscript r of each of the $B_r(u)$ and $A_r(u_j)$ represents specific positions, and are also indicated as $B_{x,y}(u)$ and $A_{x,y}(u_j)$, respectively.

In some embodiments, the first lens 140 is an optical system constituted by several sets of lenses.

In some embodiments, the spatial light modulator 170 includes at least one liquid-crystal spatial light modulator (LC-SLM), and is configured to modulate amplitudes (strengths) and phases of lights at multiple positions in the space.

In some embodiments, the optical recording medium 120 includes doped transition metal(s), rare-earth element(s), and medium(s) that is/are photosensitive. The optical recording medium 120 is configured to store interference results, and diffraction gratings are structurally formed in the optical recording medium 120.

In some embodiments, the image receiving device 160 includes at least one charge-coupled device (CCD), and is configured to receive interference signal(s), for reconstructing image(s).

In some embodiments, the first lens 140 is disposed between the spatial light modulator 170 and the optical recording medium 120.

In some embodiments, the second lens 150 is disposed between the optical recording medium 120 and the image receiving device 160.

In some embodiments, the state controller 130 includes at least one motor for driving rotation of at least one of the mirror 110 or at least one motion controller.

Figure 3B:
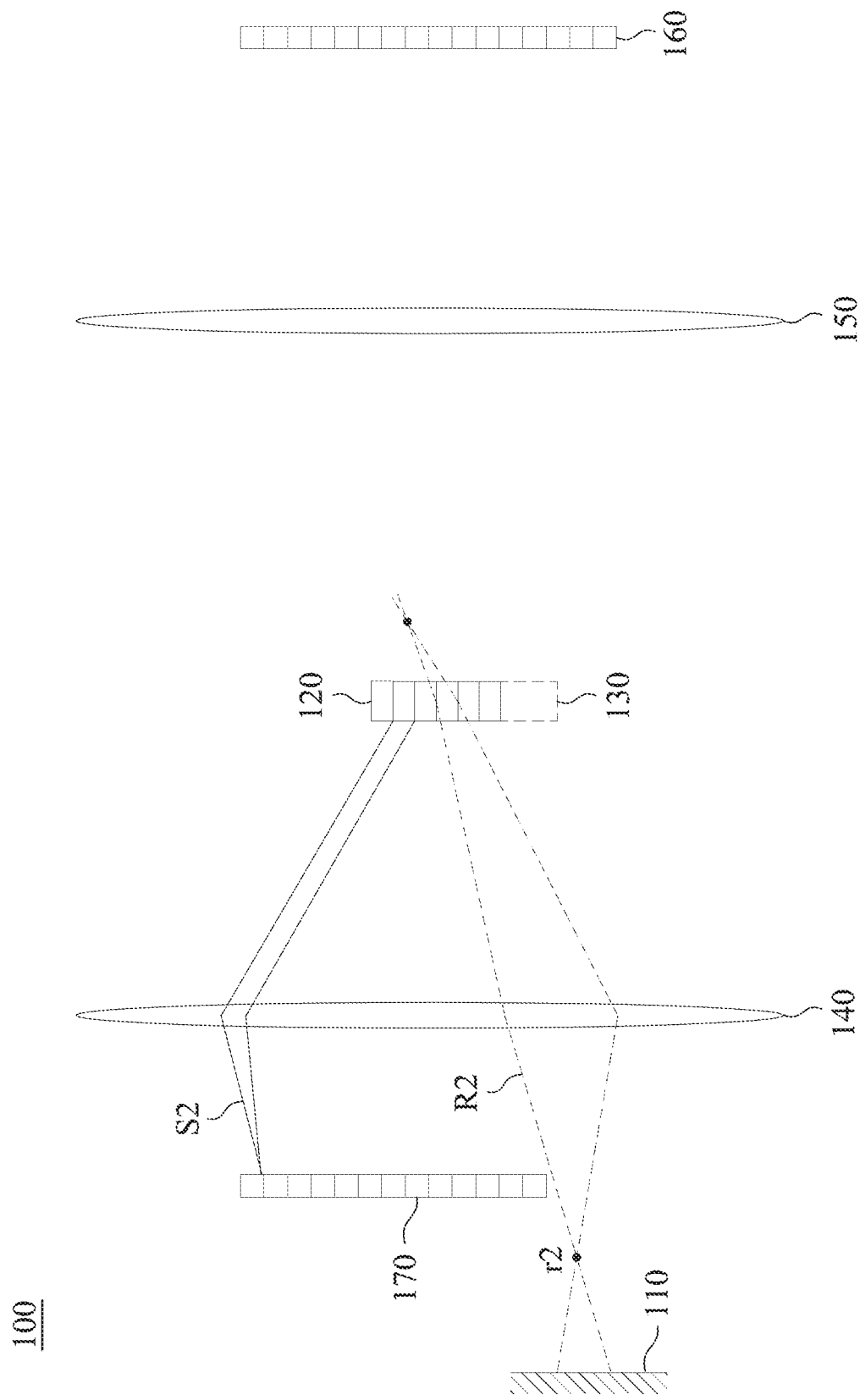
FIG. 3B is a schematic recording state diagram of a holographic storage system, in accordance with an embodiment of the present disclosure.
Figure 4:
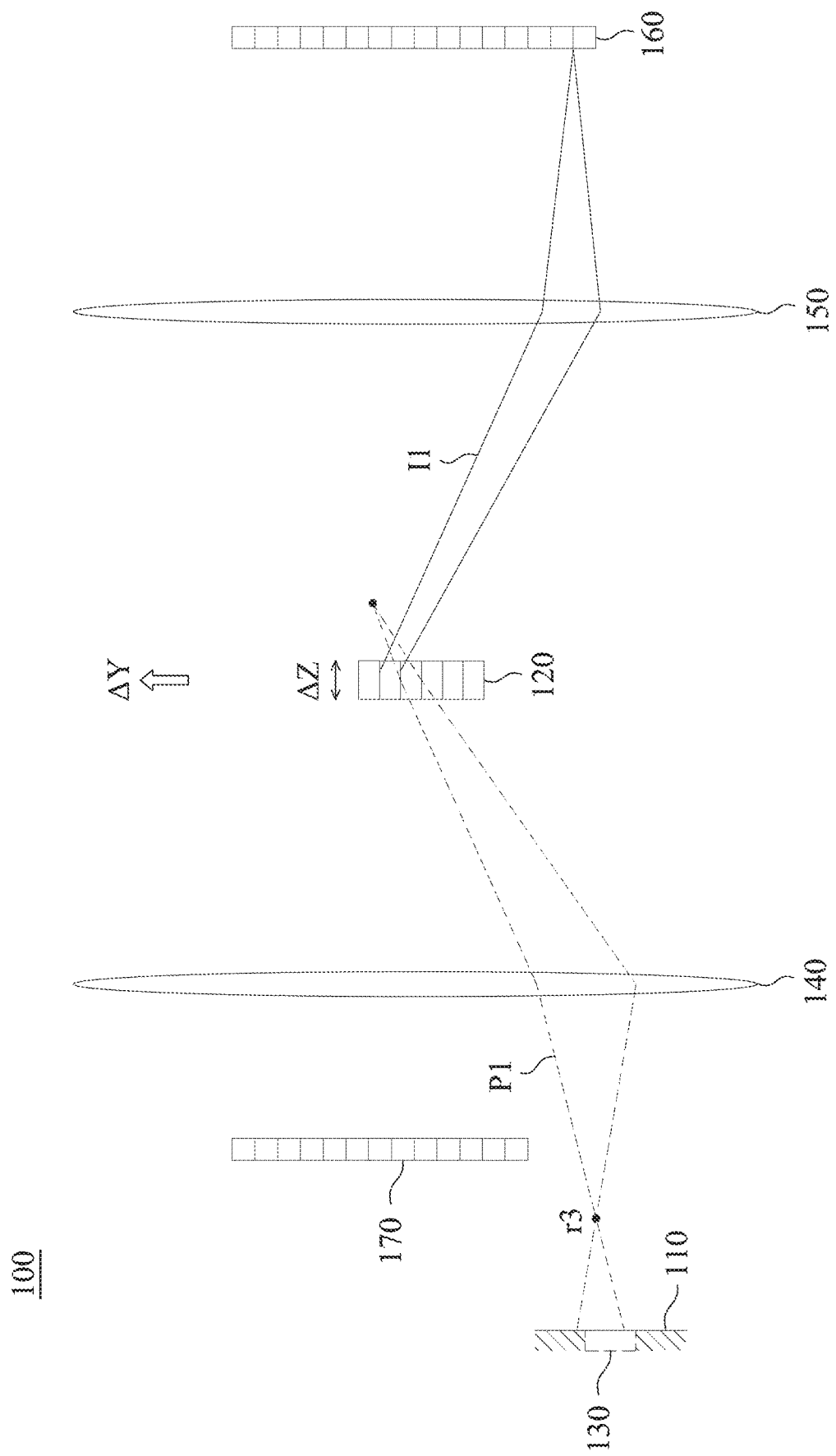
FIG. 4 is a schematic reading state diagram of a holographic storage system, in accordance with an embodiment of the present disclosure.

For ease of understanding the operations of the holographic system 100 shown in FIG. 3A, reference is made with respect to FIGS. 3A, 3B and 4. FIG. 3B is a schematic recording state diagram of a holographic storage system, in accordance with an embodiment of the present disclosure. FIG. 4 is a schematic reading state diagram of a holographic storage system, in accordance with an embodiment of the present disclosure. The holographic storage system in FIGS. 3B and 4 corresponds to the holographic storage system 100 in FIG. 3A, and it merely illustrates the writing states (shown in FIG. 3B) and the reading states (shown in FIG. 4) for various lights with various timing sequence. In some embodiments, the state controller 130 is located behind the mirror 100 shown in FIG. 3A, and is configured to control the mirror 100. In some embodiments, the state controller 130 is located at a position where the optical recording medium 120 shown in FIG. 3B is located, and is configured to control the optical recording medium 120. It should be illustrated that, the state controller 130 shown in FIG. 4 is located behind the mirror 100 shown in FIG. 3A, or is located at a position where the optical recording medium 120 shown in FIG. 3B is located.

Subsequently, with reference to FIG. 3A, the state controller 130 generates a spatial relationship between a first reference light R1 and the optical recording medium 120. The spatial light modulator 170 provides a first signal light S1. The first reference light R1 and the first signal light S1 are transferred through the first lens 140 to the optical recording medium 120, for recording a first interference grating.

In addition, with reference to FIG. 3B, the state controller 130 generates a spatial relationship between a second reference light R2 and the optical recording medium 120. The spatial light modulator 170 provides a second signal light S2. The second reference light R2 and the second signal light S2 are transferred through the first lens 140 to the optical recording medium 120, for recording a second interference grating. On the above basis, M interference gratings are recorded in the optical recording medium 120.

Subsequently, with reference to FIG. 4, the state controller 130 changes a spatial relationship between a reading light P1 and the optical recording medium 120. The reading light P1 is transferred through the first lens 140 to the optical recording medium 120. The diffraction signals of the M interference gratings are read at the same time, for generating an interference signal I1, wherein the interference signal I1 is indicated as $I_1(u)=|B_{\alpha,\beta}(u)|^2$. The state controller 130 changes the state control volume u of the reading light P1 (which is a spatial relationship volume between the reading light P1 and the optical recording medium 120), for generating a corresponding interference signal $I_1(u)$. The interference signal I1 transferred through the second lens 150 is received by the image receiving device 160, for obtaining the image.

Figure 5:
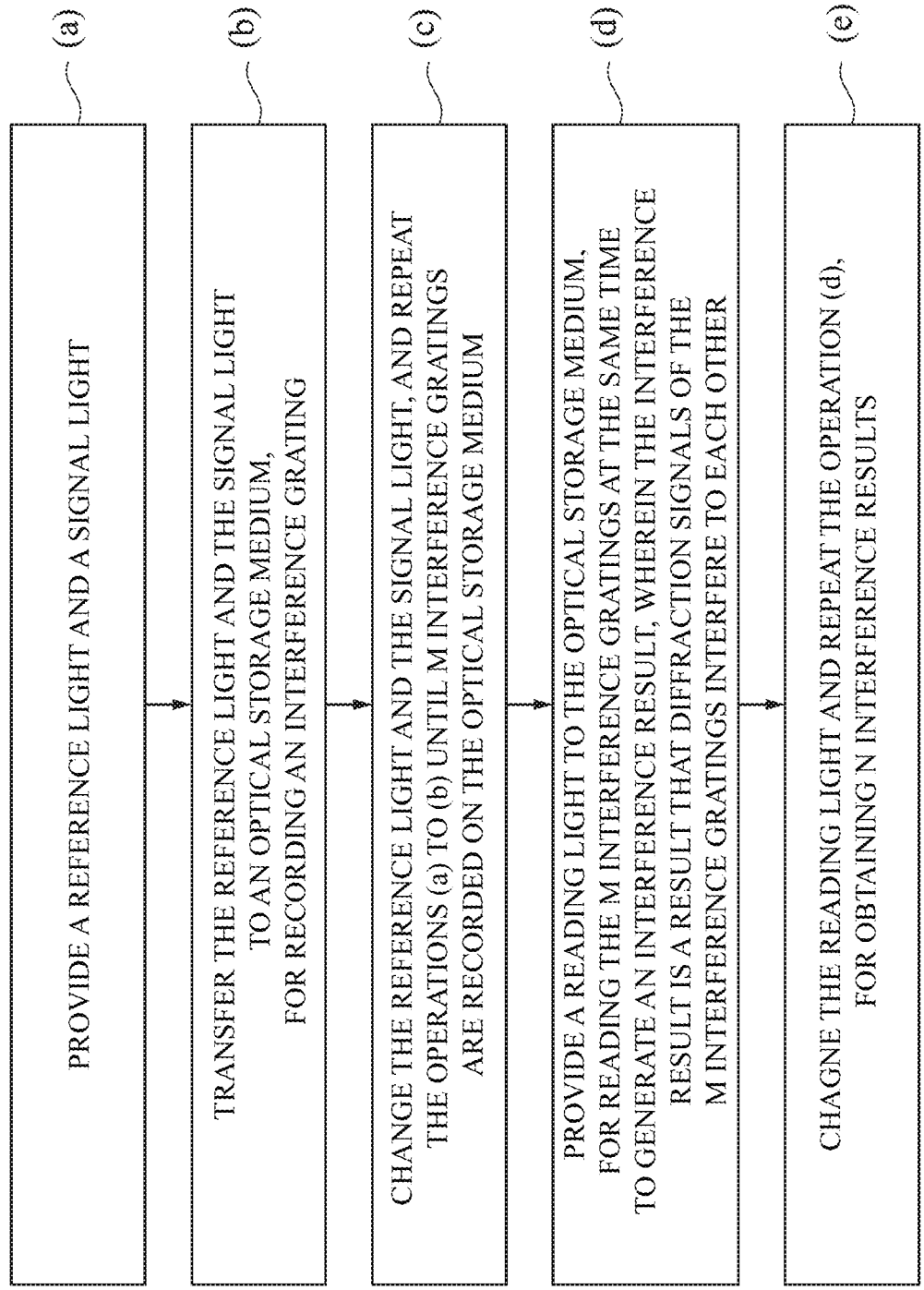
FIG. 5 is a flowchart of a method for reading and writing with a holographic system, in accordance with an embodiment of the present disclosure.

FIG. 5 is a flowchart of a method for reading and writing with a holographic system, in accordance with an embodiment of the present disclosure. In some embodiments, the method 500 for reading with the holographic system is operated by the holographic storage system 100 shown in FIGS. 3A to 4.

In operation (a), a reference light and a signal light are provided.

In some embodiments, with reference to FIG. 3A, the state controller 130 generates the spatial relationship between the first reference light R1 and the optical recording medium 120. The spatial light modulator 170 provides at least one of a strength or a phase of the first signal light S1. In some embodiments, the first reference light R1 is irradiated from a position r1.

In operation (b), the reference light and the signal light are set to be transferred to an optical recording medium, for recording an interference grating.

In some embodiments, with reference to FIG. 3A, after the first reference light R1 and the first signal light S1 are transferred through the first lens 140 to the optical recording medium 120, wave fronts of both of the first reference light R1 and the first signal light S1 interfere to each other, and the interference result is recorded as the first interference grating by the optical recording medium 120. In some embodiments, a motion relationship between at least one of the first reference light R1 or the first signal light S1 and the optical recording medium 120 must approach to be static during the recording.

In operation (c), the reference light and the signal light are changed, and the operations (a) to (b) are repeated until M interference gratings are recorded on the optical recording medium.

In some embodiments, with reference to FIG. 3A, the state controller 130 generates the spatial relationship between the second reference light R2 and the optical recording medium 120. The spatial light modulator 170 provides at least one of a strength or a phase of the second signal light S2. The second signal light S2 in FIG. 3B and the first signal light S1 in FIG. 3A are different from one another. In some embodiments, the second reference light R2 is irradiated from a position r2. In some embodiments, the position r1 and the position r2 are different from one another.

In some embodiments, with reference to FIG. 3B, since the second reference light R2 is irradiated from the position r2, there is a phase difference between the second reference light R2 and the first reference light R1 that is irradiated from the position r1. In some embodiments, a motion relationship between the second reference light R2 and the optical recording medium 120 must approach to be static for operating a motion of the recording.

In some embodiments, the operations (a) to (b) are repeated until the M interference gratings are recorded on the optical recording medium 120.

In operation (d), a reading light is provided to the optical recording medium, for reading the M interference gratings at the same time to generate an interference result, wherein the interference result is a result that diffraction signals of the M interference gratings interfere to each other.

In operation (e), the reading light is changed and the operation (d) is repeated, for obtaining N interference results.

In some embodiments, with reference to FIG. 4, the state controller 130 changes the spatial relationship between the reading light P1 and the optical recording medium 120. The reading light P1 that is irradiated from a position r3 is transferred through the first lens 140 to the optical recording medium 120. At this moment, the first interference grating, the second interference grating, ..., and the M interference grating are stored on the optical recording medium 120. Subsequently, by irradiating the reading light P1 onto the optical recording medium 120, the first interference grating, the second interference grating, ..., and the M interference grating are read at the same time. The reading light signals interfere to each other to form the interference signal I1, wherein the interference signal I1 is indicated as $I_1(u)=|B_{\alpha,\beta}(u)|^2$. In the reading state, the state controller 130 may be controlled to change the state control volume u of the reference light R. As such, the optical recording medium 120 is irradiated by the reference light R, for proceeding the reading operation. Eventually, a spatial field output result in the equation 1 is generated, wherein the spatial field output result is indicated as $I_1(u)=|B_{\alpha,\beta}(u)|^2$. The spatial field output result changes when the state control volume u changes.

In some embodiments, a manner, for changing the state control volume u of the reference light R by utilizing the reading light P to proceed reading and controlling the state controller 130, includes the operation of utilizing a rotary actuator to rotate the mirror 110 with respect to the $x_1$ axis or the $y_1$ axis, for changing an angle that the reading light P incidents onto the optical recording medium 120. Wave fronts of the reference light R are spherical wave fronts with the spherical aberration, and the spatial field output result in the equation 1 is generated, wherein the spatial field output result is indicated as $I_1(u)=|B_r(u)|^2$. The spatial field output result changes when the state control volume u changes. It is noted that, $|B_r(u)|^2$ is $|B_{\alpha,\beta}(u)|^2$ or $|B_{x,y}(u)|^2$, in some embodiments.

In some embodiments, a manner, for changing the state control volume u of the reference light R by utilizing the reading light P to proceed reading and controlling the state controller 130, includes the operation of utilizing a rotary actuator to rotate optical recording medium 120 with respect to the $x_2$ axis or the $y_2$ axis, for changing an angle that the reading light P incidents onto the optical recording medium 120. Wave fronts of the reference light R are spherical wave fronts with the spherical aberration, and the spatial field output result in the equation 1 is generated, wherein the spatial field output result is indicated as $I_1(u)=|B_r(u)|^2$. The spatial field output result changes when the state control volume u changes. It is noted that, $|B_r(u)|^2$ is $|B_{\alpha,\beta}(u)|^2$ or $|B_{x,y}(u)|^2$, in some embodiments.

In some embodiments, a manner, for changing the state control volume u of the reference light R by utilizing the reading light P to proceed reading and controlling the state controller 130, includes the operation of utilizing a rotary actuator to rotate the mirror 110 with respect to the $z_1$ axis, for changing a position that the reading light P incidents onto the optical recording medium 120. Wave fronts of the reference light R are spherical wave fronts with the spherical aberration, and the spatial field output result in the equation 1 is generated, wherein the spatial field output result is indicated as $I_1(u)=|B_r(u)|^2$. It is noted that, $|B_r(u)|^2$ is $|B_{\alpha,\beta}(u)|^2$ or $|B_{x,y}(u)|^2$, in some embodiments.

In some embodiments, a manner, for changing the state control volume u of the reference light R by utilizing the reading light P to proceed reading and controlling the state controller 130, includes the operation of utilizing a rotary actuator to rotate the optical recording medium 120 with respect to the $z_2$ axis, for changing a position that the reading light P incidents onto the optical recording medium 120. Wave fronts of the reference light R are spherical wave fronts with the spherical aberration, and the spatial field output result in the equation 1 is generated, wherein the spatial field output result is indicated as $I_1(u)=|B_r(u)|^2$. It is noted that, $|B_r(u)|^2$ is $|B_{\alpha,\beta}(u)|^2$ or $|B_{x,y}(u)|^2$, in some embodiments.

In some embodiments, a manner, for changing the state control volume u of the reference light R by utilizing the reading light P to proceed reading and controlling the state controller 130, includes the operation of utilizing a displacement actuator to moves the optical recording medium 120 along a specific direction in the space (e.g., a displacement $\Delta Z$ of the optical recording medium 120 in the $z_2$ direction, or a displacement $\Delta Y$ of the optical recording medium 120 in the $y_2$ direction), for changing a position that the reading light P incidents onto the optical recording medium 120. Wave fronts of the reference light R are spherical wave fronts with the spherical aberration, and the spatial field output result in the equation 1 is generated, wherein the spatial field output result is indicated as $I_1(u)=|B_r(u)|^2$. It is noted that, $|B_r(u)|^2$ is $|B_{\alpha,\beta}(u)|^2$ or $|B_{x,y}(U)|^2$, in some embodiments.

In some embodiments, an optical system constituted by the second lens 150 causes a physical relationship between the optical recording medium 120 and the image receiving device 160 illustrated in FIGS. 3A to 4 be a relationship of Fourier transform, an angle distribution function, that is a diffraction from the optical recording medium 120, is transformed to a position distribution function by the second lens 150. The angle distribution function is indicated as $I_1(u)=|B_{\alpha,\beta}(u)|^2$, and the position distribution functions indicated as $I_1(u)=|B_{x,y}(u)|^2$. Continuously, the interference signal 11 is received by the image receiving device 160, for obtaining a holographic image.

In some embodiments, an optical system constituted by the second lens 150 causes a physical relationship between the optical recording medium 120 and the image receiving device 160 illustrated in FIGS. 3A to 4 be a relationship of physics, a position distribution function, that is a diffraction $I_1(u)$ from the optical recording medium 120, wherein the position distribution function is indicated as $I_1(u)=|B_{x,y}(u)|^2$ (which should be noted that, is not $|B_{\alpha,\beta}(u)|^2$). The position distribution function that is the diffraction from the optical recording medium 120 is kept to be the position distribution function by the second lens 150, and such position distribution function is indicated as $I_1(u)=|B_{x,y}(u)|^2$. Continuously, the interference signal 11 is received by the image receiving device 160, for obtaining the holographic image.

In some embodiments, the second lens 150 is an optical system constituted by several sets of lenses.

Figure 6:
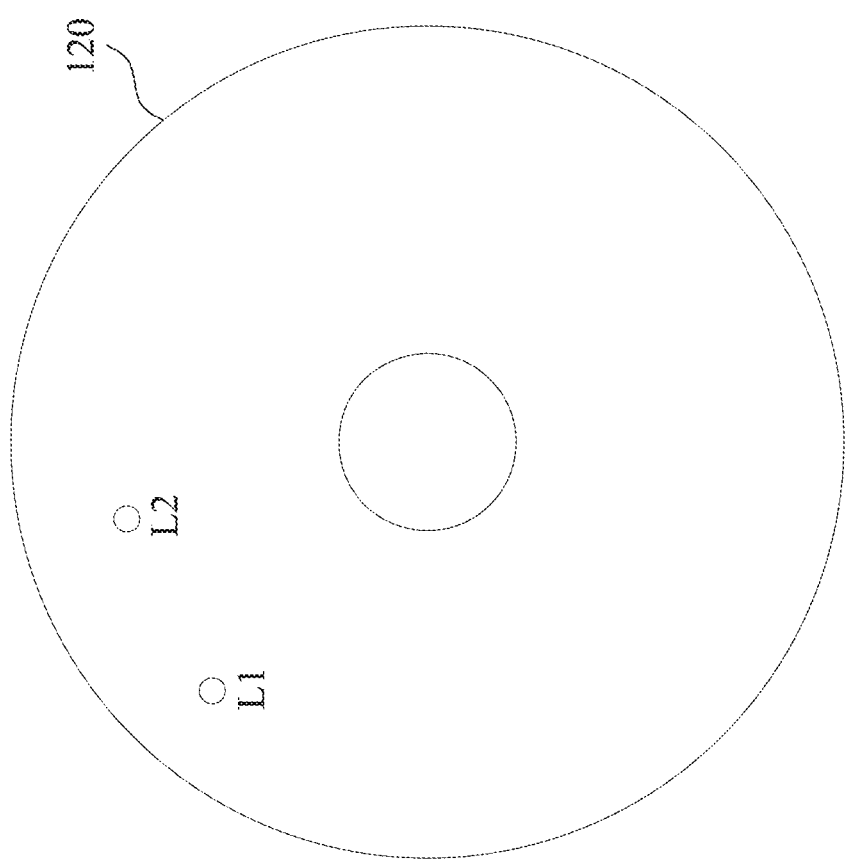
FIG. 6 is a schematic position diagram of an optical recording medium, in accordance with an embodiment of the present disclosure.

FIG. 6 is a schematic storage position diagram of an optical recording medium, in accordance with an embodiment of the present disclosure. In some embodiments, an optical recording medium 120 shown in FIG. 6 corresponds to the optical recording medium 120 shown in FIGS. 1A to 4.

In some embodiments, if the optical system is that shown in FIGS. 1A to 4, the first interference grating and the second interference grating are adjacent data frames during the reading operation, and storage positions of the first interference grating and the second interference grating must be overlapped at a same position. For example, a position, storing the first interference grating and the second interference grating, is at least one of the storage points L1 or L2 shown in FIG. 6. The storage positions are not limited to that illustrated in figures of the present disclosure, and may be any points on the optical recording medium 120.

In some embodiments, with reference to FIG. 4, the holographic storage system 100 is configured to read a single diffraction signal $I_1(u)$ at once. The single diffraction signal $I_1(u)$ is a signal when the state controller 130 controls the state control volume of the reference light R to be a specific value u. The holographic storage system 100 is configured to read a continuous diffraction signal $I_1(u)$ continuously. The continuous diffraction signal $I_1(u)$ is a signal when the state controller 130 controls the state control volume of the reference light R to be a specific value u.

In some embodiments, with reference to FIGS. 3A to 3B, a physical relationship between the second reference light R2 and the optical recording medium 120 and is different from a physical relationship between the first reference light R1 and the optical recording medium 120. However, a variation between the reading state and the recording state is less than an angle tolerance or a displacement tolerance, among the operations (a) to (e). In the operation (e), the first interference grating, the second interference grating, . . . , and the M interference grating are read at the same time. A decreasing level of a diffraction efficiency is less than 90% (e.g., the lowest the diffraction efficiency is down to 10%), which is resulted from a reading and writing phase offset $\phi(u-u_j)$ of each of the interference gratings.

In some embodiments, in order to induce a boarder range to the state control volume u by the state controller 130 in the reading operation, and in order to reach that the decreasing level of the diffraction efficiency resulted from the reading and writing phase offset ø(u–u$_j$) of each of the interference gratings is less than 90%, a relationship, between wave vectors of the reading and writing phase offset ø(u–u$_j$) of the first interference grating, the second interference grating, . . . , and the M interference grating, is a relationship of Bragg degeneracy, wherein the reading and writing phase offset ø(u–u$_j$) is caused by the state controller 130.

In some embodiments, with reference to FIG. 4, the M interference gratings are read by the holographic storage system 100 at the same time. A value of M is more than 3 and is less than 100 thousand.

In some embodiments, with reference to FIG. 4, in order to make a specific pixel of the image that is received by the image receiving device 160 output an interference signal that is set by users, a signal transform is provided. As such, when a physical relationship between the spatial light modulator 170 and the optical recording medium 120 is a relationship of an object, the signal transform exists as below:

$$SLM_{x,y}(j) = H_{x,y} B_{x,y}^T(p) \qquad \text{Equation 3}$$

When a physical relationship between the spatial light modulator 170 and the optical recording medium 120 is a relationship of Fourier transform, a signal transform exists as below:

$$SLM_{\alpha\beta}(j) = H_{\alpha\beta} B_{\alpha\beta}^T(p) \qquad \text{Equation 4}$$

When "r" uniformly represents a specific spatial parameter, each of the equations 3 and 4 is also indicated as below:

$$SLM_{r1,r2}(j) = H_{r1,r2} B_{r1,r2}^T(p) \qquad \text{Equation 5}$$

As illustrated in the equation 5, "$SLM_{r1,r2}(j)$" is a specific modulated electric field. "$H_{r1,r2}$" in the equation 5 is a signal converting matrix. "$B_{r1,r2}(p)$" in the equation 5 is an interfering electric field at a specific position that is set by the users. "r1" and "r2" in the equation 5 are spatial parameters. "j" is a counting value of the recorded interference gratings.

In some embodiments, the specific modulated electric field $SLM_{r1,r2}(j)$ is configured to simply modulate strengths, and is indicates as $C_{r1,r2}(j)$. In some embodiments, the specific modulated electric field $SLM_{r1,r2}(I)$ is configured to simply modulate phases, and is indicates as $D_{r1,r2}(j)$. In some embodiments, the specific modulated electric field $SLM_{r1,r2}(j)$ is configured to modulate both of strengths and phases, and is indicates as $C_{r1,r2}(j) D_{r1,r2}(j)$.

In some embodiments, the signal converting matrix $H_{r1,r2}$ is obtain by utilizing optimization or artificial intelligence algorithm to approach the interfering electric field at the specific position $B_{r1,r2}(p)$.

In some embodiments, the signal converting matrix $H_{r1,r2}$ is obtain by utilizing the experienced optimal value to approach the interfering electric field at the specific position $B_{r1,r2}(p)$.

In some embodiments, a size of the signal converting matrix $H_{r1,r2}$ is Mx N. M is a total number of elements of the modulated electric field $SLM_{r1,r2}(j)$. N is a total number of elements of the interfering electric field at the specific position $B_{r1,r2}(p)$ that is set by the users.

In some embodiments, elements of the interfering electric field at a specific position $B_{r1,r2}(p)$ set by the users are binary signals, wherein "1" represents a signal with high level, and "0" represents a signal with low level. In order to make signal-to-noise (S/N) ratio be more than 1, a total number of the signals with high level included in N elements of the interfering electric field at a specific position $B_{r1,r2}(p)$ is less than M that is a total number of elements of the modulated electric field $SLM_{r1,r2}(j)$.

In some embodiments, if input electric field modulation functions $SLM_{r1,r2}(j)$ are utilized by a spatial light modulator (SLM) to proceed modulating, the signal converting matrix $H_{r1,r2}$ in the equation 3 is utilized to calculate each one of the input electric field modulation functions $SLM_{r1,r2}(I)$ of the pixel positions (ξ, η) respectively, and to set up a three-dimensional matrix SLM(ξ, η, j). Continuously, the input electric field spatial modulation functions $SLM_j(ξ, η)$ are extracted respectively, in the j-th recording state. Subsequently, the spatial modulated device correspondingly outputs $SLM_j(ξ, η)$ with various values j. The holographic storage system 100 shown in FIG. 3A is therefore configured to write the outputs $SLM_j(ξ, η)$ into the optical recording medium 120.

In some embodiments, a spatial parameter offset of a diffraction light of each of the gratings is generated due to the increased reading and writing phase offset ø(u–u$_j$). Each one of the input electric field modulation functions $SLM_{r1,r2}(j)$ of the pixel positions (ξ, η) offsets when the j increases, for respectively compensating the spatial parameter offsets of the gratings that are different from one another.

Based on the above embodiments, a method for reading and writing with holographic system and a holographic storage system are provided in the present disclosure, thereby an issue is improved. The issue includes that the diffraction efficiency gets lower, which is resulted from one same position that is recorded by the optical recording medium getting more frames.

Although the present invention has been described in considerable detail with reference to certain embodiments thereof, it will be apparent to those skilled in the art that various modifications and variations can be made to the structure of the present invention without departing from the scope or spirit of the invention. As a result, it is intended that the present invention cover modifications and variations of this invention provided they fall within the scope of the following claims.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for reading and writing with holographic system, comprising:
    (a) providing a reference light and a signal light;
    (b) transferring the reference light and the signal light to an optical recording medium, for recording an interference grating;
    (c) changing the reference light and the signal light and repeating the operations (a) to (b) until M interference gratings are recorded on the optical recording medium;
    (d) providing a reading light to the optical recording medium, for reading the M interference gratings at the same time to generate an interference result, wherein the interference result is a result that diffraction signals of the M interference gratings interfere to each other; and (e) changing the reading light and repeating the operation (d), for obtaining N interference results.

2. The method for reading and writing with holographic system of claim 1, wherein the reading the M interference gratings at the same time, a value of M is more than 3 and is less than 100 thousand.

3. The method for reading and writing with holographic system of claim 2, wherein the reading the M interference gratings at the same time, a decreasing level of a diffraction efficiency of the M interference gratings is less than 90%.

4. The method for reading and writing with holographic system of claim 3, wherein a total number N of the interference results is more than a total number M of the interference gratings.

5. The method for reading and writing with holographic system of claim 4, wherein a total number of a high level signal of the N interference results is less than a total number M of the interference gratings.

6. The method for reading and writing with holographic system of claim 1, further comprising:
when utilizing a spatial light modulating device to modulate a j-th interference grating of the M interference gratings with a specific spatial parameter, a modulation $SLM_{r1,r2}(j)$ of the spatial light modulating device is calculated by utilizing the N interference results $B_{r1,r2}{}^T(p)$ and a signal converting matrix $H_{r1,r2}$, wherein the j is a positive integer, and a calculation formula is indicated as below:

$$SLM_{r1,r2}(j)=H_{r1,r2}B_{r1,r2}{}^T(p).$$

7. The method for reading and writing with holographic system of claim 6, wherein a diffraction light of one of the M interference gratings is a spatial parameter offset generated from increasing a reading and writing phase offset $\emptyset(u-u_j)$, and the modulation $SLM_{r1,r2}(j)$ of a plurality of pixel positions ($\xi$, $\eta$) offsets when the j increases, for compensating the spatial parameter offsets of the M interference gratings that are different from one another.

8. The method for reading and writing with holographic system of claim 7, wherein the changing the reading light and repeating the operation (d) for obtaining the N interference results further comprising:
changing a state control volume of the reading light; and
changing a spatial relationship between the reading light and the optical recording medium, for generating an output result that changes when the state control volume changes.

9. The method for reading and writing with holographic system of claim 8, the providing the reading light to the optical recording medium for reading the M interference gratings at the same time to generate the interference result further comprising:
wherein the reference light comprises a first reference light and a second reference light,
changing the spatial relationship between the incident reading light and the optical recording medium, for generating a first reading and writing phase offset between the reading light and the first reference light, and for generating a second reading and writing phase offset between the reading light and the second reference light, wherein a secondary derivative of each of the first reading and writing phase offset and the second reading and writing phase offset with respect to the state control volume is not equal to zero.

10. The method for reading and writing with holographic system of claim 9, wherein a relationship between a wave vector of the reading and writing phase offset and a wave vector of the M interference gratings is a relationship of Bragg degeneracy.

11. A holographic storage system, comprising:
a spatial modulating device configured to modulate a plurality of lights;
an optical recording medium configured to store an interference result;
an image receiving device configured to receive an interference signal for reconstructing an image;
a state controller configured to control, in a writing state, a spatial relationship between the plurality of lights and the optical recording medium, and configured to generate, in a reading state, a reading and writing phase offset;
a first lens disposed between the spatial modulating device and the optical recording medium, and configured to transfer the plurality of lights; and
a second lens disposed between the spatial modulating device and the image receiving device, and configured to transfer the plurality of lights,
wherein the state controller controls a spatial relationship between a reference light and the optical recording medium, the spatial modulating device provides a signal light, the reference light and the signal light are transferred through the first lens to the optical recording medium for recording an interference grating, the state controller and the spatial modulating device change the reference light and the signal light, and repeatedly record M interference gratings in the optical recording medium, and
in the reading state, the state controller controls a spatial relationship between a reading light and the optical recording medium, and reads M interference gratings at the same time for generating the interference result, the state controller changes the reading light for obtaining N interference results, an interference result of diffraction signals of the M interference gratings interfering to each other is transferred through the second lens to the image receiving device.

12. The holographic storage system of claim 11, wherein the spatial relationship between the reference light and the optical recording medium is generated by the state controller, and the interference grating is recorded by the state controller.

13. The holographic storage system of claim 11, wherein the reading light is further transferred through the first lens to the optical recording medium, and the diffraction signals of the M interference gratings are read through the first lens at the same time,
the state controller changes the spatial relationship between the reading light and the optical recording medium, for generating a corresponding interference signal, and
the interference signal transferred through the second lens is received by the image receiving device, for obtaining the image.

14. The holographic storage system of claim 11, wherein a physical relationship between the optical recording medium and the image receiving device is a relationship of Fourier transform.

15. The holographic storage system of claim 11, wherein a physical relationship between the optical recording medium and the image receiving device is a relationship of physics.

16. The holographic storage system of claim 11, wherein at least one of the first lens or the second lens is an optical system constituted by a plurality of lenses.

17. The holographic storage system of claim 11, wherein
the state controller changes the spatial relationship between the reading light and the optical recording medium at once, for generating the single interference signal, and
the state controller changes the spatial relationship between the reading light and the optical recording medium continuously, for generating the continuously changed interference signal.

\* \* \* \* \*